(12) United States Patent
Keen et al.

(10) Patent No.: US 6,780,215 B2
(45) Date of Patent: Aug. 24, 2004

(54) VACUUM PUMP ASPIRATOR FOR WORK VEHICLE PRE-CLEANER

(75) Inventors: Eric A. Keen, Waterloo, IA (US); Brent A. Lyman, Cedar Falls, IA (US); Dennis A. Bowman, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/365,755

(22) Filed: Feb. 12, 2003

(65) Prior Publication Data

US 2003/0116372 A1 Jun. 26, 2003

Related U.S. Application Data

(62) Division of application No. 09/870,764, filed on May 31, 2001, now Pat. No. 6,588,524.

(51) Int. Cl.[7] ............................................. B01D 50/00
(52) U.S. Cl. .................... 55/385.3; 55/468; 180/69.24
(58) Field of Search ............................ 180/69.2, 69.24, 180/69.21; 55/315, 431, 466, 467, 385.3, 468; 123/198 E, 200; 248/200

(56) References Cited

U.S. PATENT DOCUMENTS

| | | | | |
|---|---|---|---|---|
| 3,838,675 A | * | 10/1974 | Schaeffer | 55/430 |
| 3,864,109 A | * | 2/1975 | Hansen | 55/324 |
| 3,877,454 A | * | 4/1975 | Axmann et al. | 123/198 E |
| 4,204,848 A | * | 5/1980 | Schulmeister et al. | 55/315.2 |
| 4,248,613 A | * | 2/1981 | Linhart | 55/394 |
| 4,323,369 A | * | 4/1982 | Monson et al. | 95/269 |
| 4,348,057 A | | 9/1982 | Parenti et al. | |
| 4,469,490 A | * | 9/1984 | Wilson | 95/269 |
| 4,514,198 A | * | 4/1985 | Develle et al. | 55/337 |
| 4,840,645 A | * | 6/1989 | Woodworth et al. | 95/270 |
| 4,907,552 A | | 3/1990 | Martin | |
| 5,183,017 A | * | 2/1993 | Bopp | 123/198 D |
| 5,403,367 A | * | 4/1995 | De Villiers et al. | 55/320 |
| 5,427,502 A | * | 6/1995 | Hudson | 415/211.1 |
| 5,449,391 A | * | 9/1995 | Decker | 55/404 |
| 5,505,756 A | * | 4/1996 | Decker | 55/399 |
| 5,678,516 A | * | 10/1997 | Sakurai | 123/198 R |
| 5,924,406 A | * | 7/1999 | Kinugasa et al. | 123/436 |
| 6,004,382 A | * | 12/1999 | Pikesh et al. | 95/270 |
| 6,014,860 A | * | 1/2000 | Schenk et al. | 60/286 |
| 6,264,712 B1 | * | 7/2001 | Decker | 55/456 |
| 6,348,077 B1 | * | 2/2002 | Solberg et al. | 55/323 |

FOREIGN PATENT DOCUMENTS

DE 3730323 A1 3/1989

* cited by examiner

*Primary Examiner*—Brian L. Johnson
*Assistant Examiner*—Kelly E Campbell

(57) ABSTRACT

The belt driven vacuum pump is provided on a work vehicle to supply the vacuum needed for the engine intake air pre-cleaner. The vacuum pump is driven at or proportional to the engine speed to ensure proper vacuum for the intake airflow. Preferably, the vacuum pump is integrated into an accessory support bracket that carries other belt driven components such as the alternator, etc. The support bracket forms the vacuum pump housing to reduce the number of components required for the vacuum pump. Air outlet passages are formed in the support bracket and are preferably directed toward accessories or engine components that can benefit from additional cooling provided by the vacuum pump exhaust air. The vacuum pump can also be equipped with a hose at the inlet and/or the exhaust sides of the vacuum pump to provide a vacuum cleaner or a blower for use on or about the work vehicle.

2 Claims, 5 Drawing Sheets ent invention as seen from the line 4—4 of FIG. 2.

VACUUM PUMP ASPIRATOR FOR WORK VEHICLE PRE-CLEANER

CROSS-REFERENCE TO RELATED APPLICATION

This application is a division of applicant's application U.S. Ser. No. 09/870,764, filed May 31, 2001 now U.S. Pat. No. 6,588,524, and titled VACUUM PUMP ASPIRATOR FOR WORK VEHICLE PRE-CLEANER.

FIELD OF THE INVENTION

The present invention relates to a vacuum pump aspirator for use in conjunction with an engine air pre-cleaner of a work vehicle.

Engine air intake systems for work vehicles typically include a pre-cleaner to remove dirt particles from the intake air prior to the air filter. Many pre-cleaners require a vacuum to pull or "scavenge" dirt particles from the fresh air ingested into the air intake system. Exhaust system aspirators have been used to supply the required vacuum. An exhaust system aspirator, however, creates a restriction in the engine exhaust, raises noise levels and raises the cost of the muffler and/or exhaust pipe. Also, a check valve is needed to prevent back flow of high temperature gases into the pre-cleaner and high temperature hoses must be used.

An alternative approach is to use a fan shroud aspirator as a source of vacuum to a pre-cleaner. This aspirator is merely an opening in the fan shroud enabling a hose to link with a pre-cleaner. Most radiator fans use a viscous coupling for optimum cooling performance and fuel economy. Depending upon the ambient air, the fan speed does not always match the engine speed. Thus, at times the fan shroud aspirator does not provide sufficient vacuum to the pre-cleaner for the engine intake air requirements.

SUMMARY OF THE INVENTION

The present invention overcomes the disadvantages described above by providing a belt driven vacuum pump coupled to the pre-cleaner to scavenge dirt particles from the pre-cleaner. The belt driven vacuum pump eliminates the need for the exhaust system aspirator with the restriction in the engine exhaust as well as eliminates the need for numerous and expensive components associated with the exhaust system aspirator. Furthermore, the speed of the belt driven aspirator is solely a function of the engine speed. The vacuum pump speed is not dependent upon fan speed and current engine cooling requirements.

In the preferred embodiment, the vacuum pump is integrated into an accessory support bracket that carries other belt driven accessories such as the alternator, air conditioning compressor, etc. and is driven by a common belt with those accessories. The vacuum pump is integrated into the support bracket by providing a recess in the support bracket itself to house the vacuum pump blade. Air outlets are formed in the support bracket and are preferably directed toward accessories or engine components that can benefit from the additional cooling provided by the airflow.

DESCRIPTION OF THE PREFERRED EMBODIMENT

Figure 1:
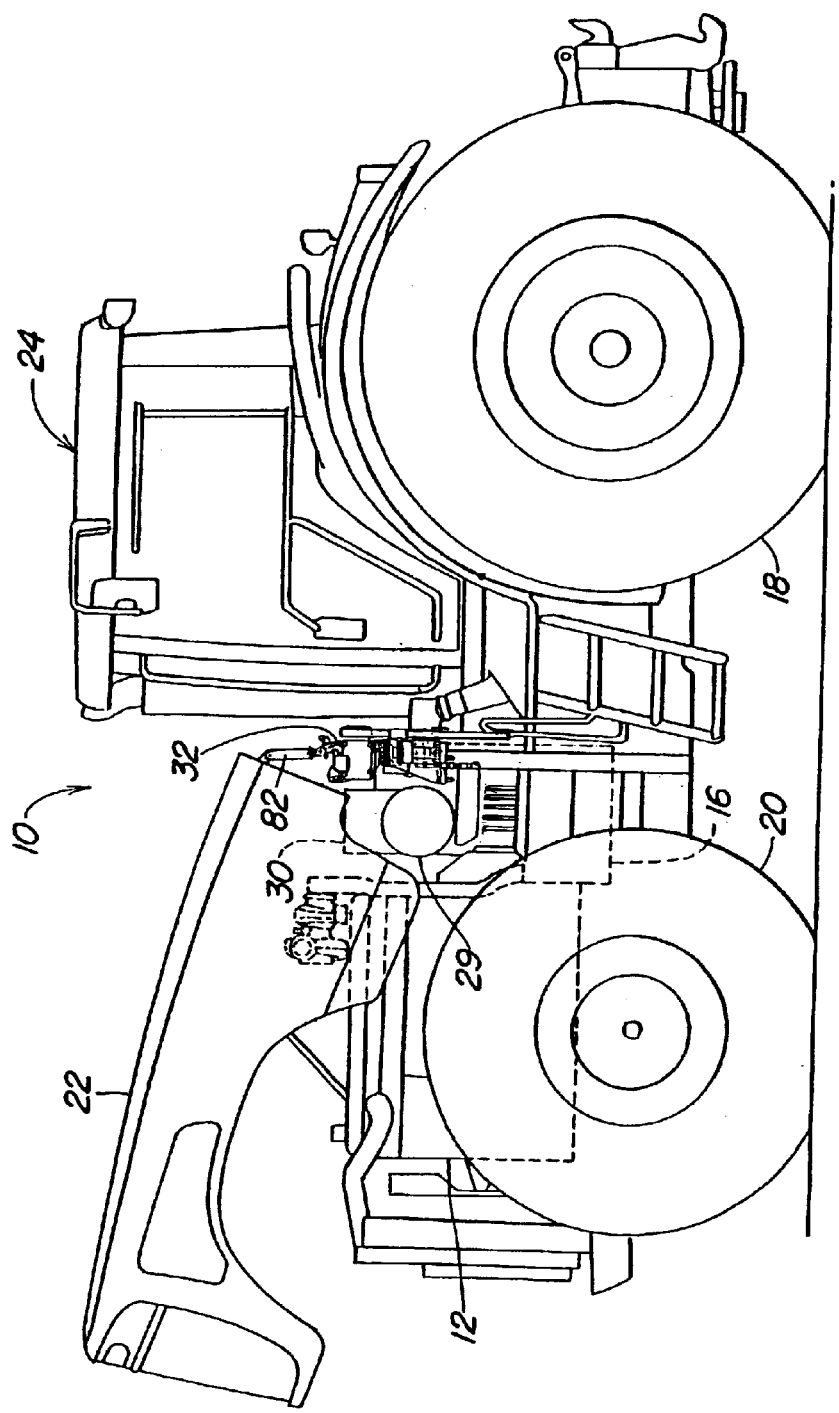
FIG. 1 is a side view of a work vehicle having the vacuum pump of the present invention.
Figure 2:
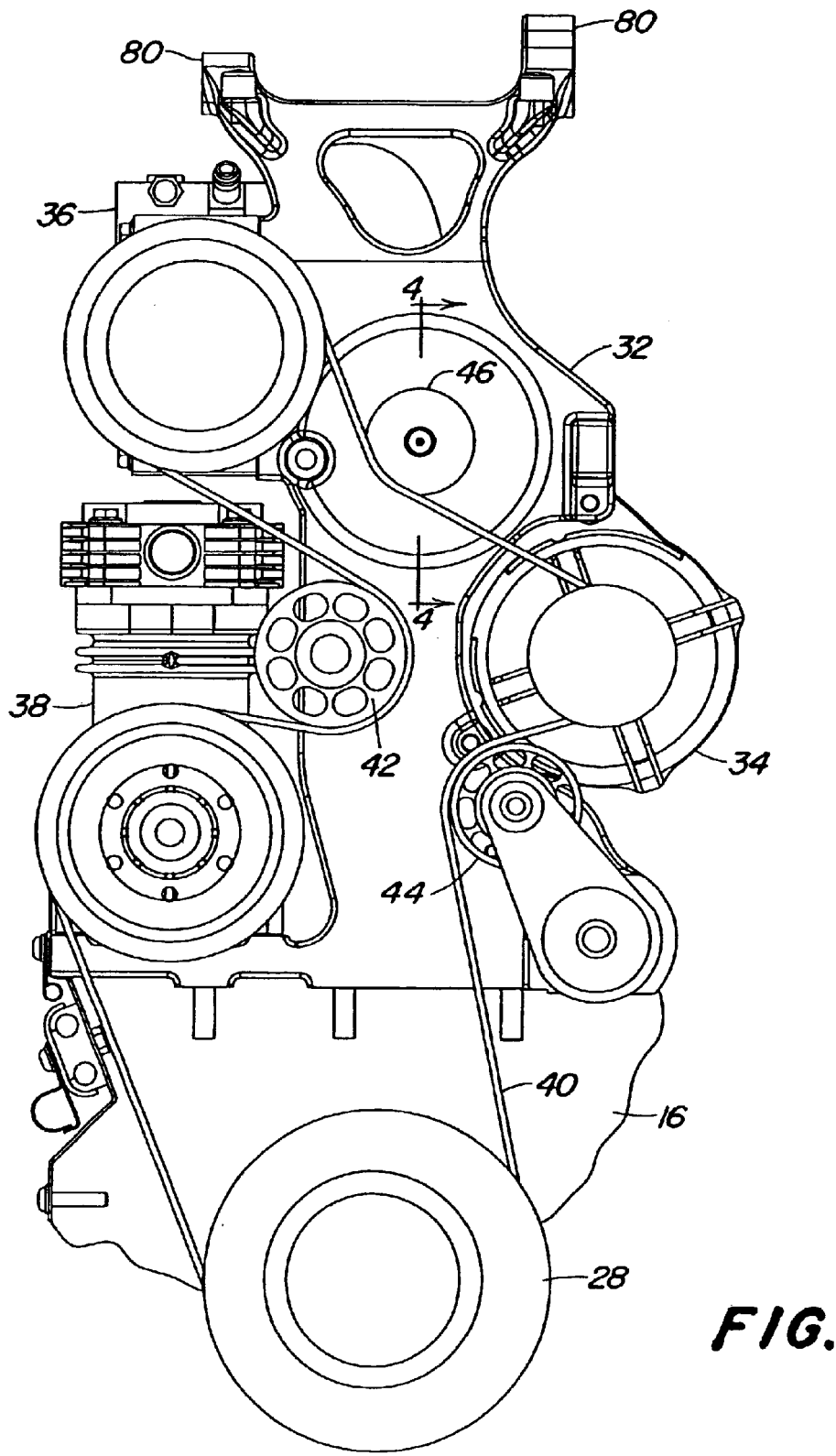
FIG. 2 is a rear elevational view of the transmission and accessory support bracket housing the vacuum pump of the present invention.

The vacuum pump of the present invention is included in the agricultural tractor 10 shown in FIG. 1. Agricultural tractor 10 includes an engine 12, a transmission 16 and a drive train not otherwise shown that connects the transmission to rear wheels 18 and front wheels 20. A hood 22, shown in a raised position, covers the engine and other components forward of the operator's cab 24. An air filter 29 is located beneath a pre-cleaner 30 and receives air therefrom which is then directed to the engine intake manifold. The transmission 16 has parallel input and output shafts. The input shaft is located near the top of the transmission and extends through the transmission to a rear belt sheave 28 (FIG. 2). The sheave 28 is driven at the engine speed or driven at a speed proportional to the engine speed.

Figure 3:
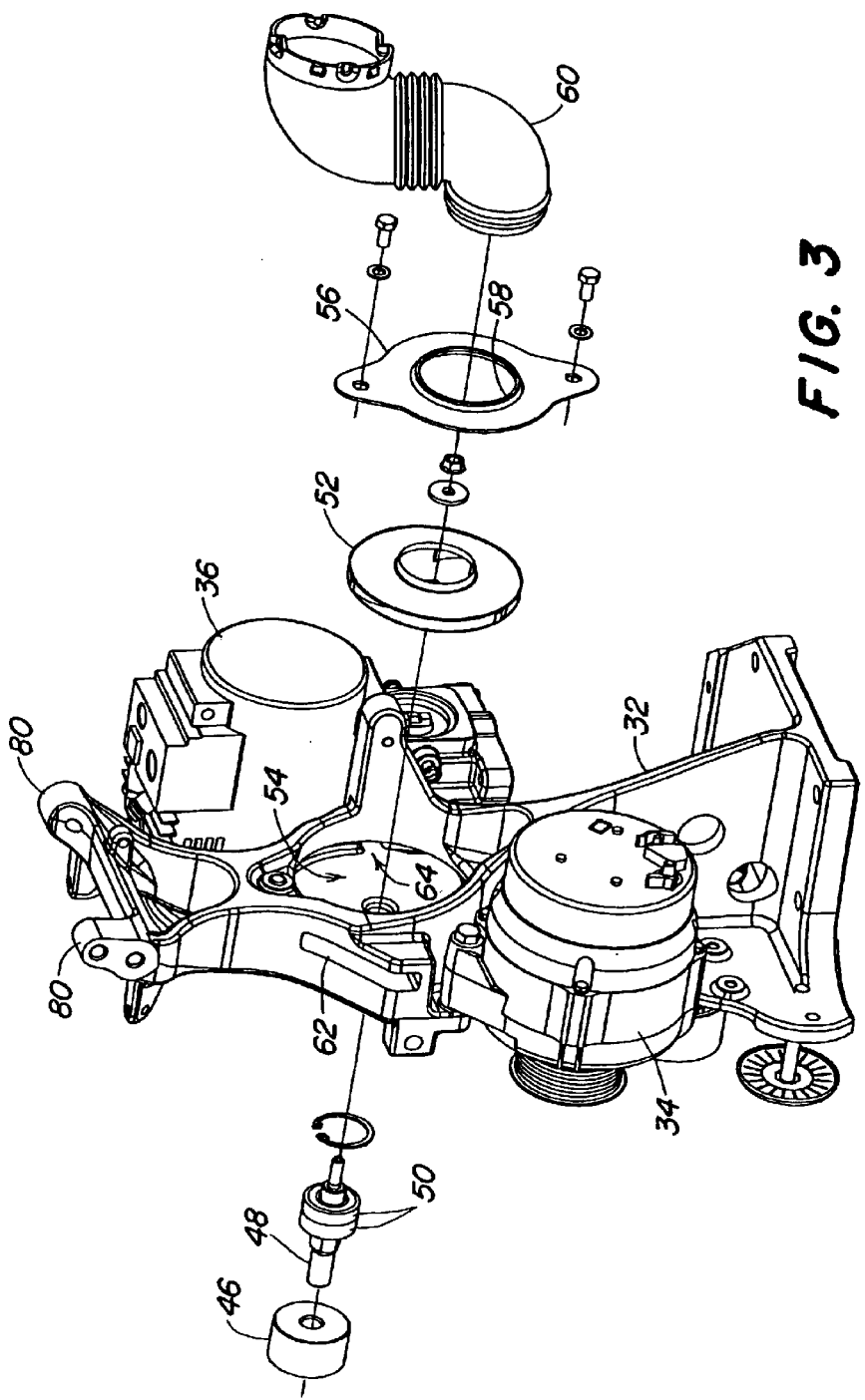
FIG. 3 is a perspective view of the accessory support bracket with accessories mounted thereto with the vacuum pump components shown exploded.
Figure 4:
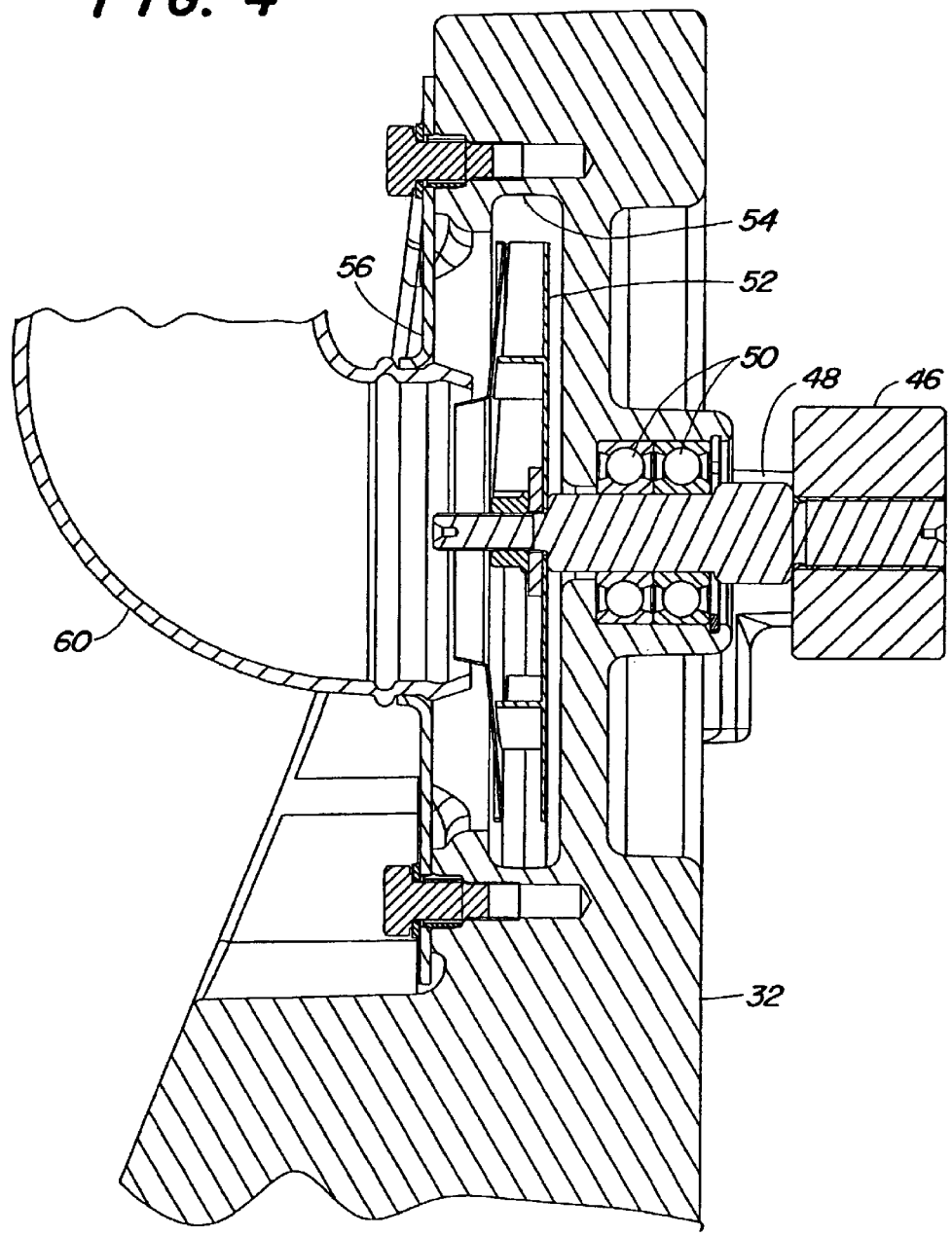
FIG. 4 is a sectional view of the vacuum pump of the present invention as seen from the line 4—4 of FIG. 2.

A cast iron support bracket 32 (FIGS. 2 and 3) is bolted to the top of the transmission 16 and extends upwardly at the rear of the transmission. Multiple belt driven accessories are carried by the support bracket 32, including the alternator 34, air conditioning compressor 36 and air compressor 38. A serpentine drive belt 40 is wrapped around the drive sheaves of the accessories as well as around an idler 42 and a tensioning idler 44.

The belt 40 also drives a vacuum pump sheave 46. The sheave 46 is coupled to a vacuum pump shaft 48 that is rotatably mounted in the support bracket 32 by bearings 50. The vacuum pump includes a blade 52 mounted to the shaft 48 for rotation. The blade 52 is disposed within a circular recess 54 formed in the support bracket 32. A cover plate 56 is disposed over the blade and has a central opening 58, forming an air inlet to the vacuum pump. A pipe 60 extends from the air inlet to the pre-cleaner 30 to apply the vacuum to the pre-cleaner and draw dirt particles therefrom. The support bracket 32 and cover 56 thus form the housing for the vacuum pump. Air outlets 62 and 64 are formed in the support bracket 32 for exhaust of air from the pump. The air outlet 62 is directed toward the exhaust system of the engine 12 while the air outlet 64 is directed toward the air compressor 38 to provide cooling to these components.

The vacuum pump of the present invention requires relatively little engine power to operate compared to the exhaust back pressure created by the exhaust system aspirator described above. In addition, fewer and less costly components are required and assembly is simplified. The vacuum pump is driven at or proportional to the engine speed to produce the vacuum required for the engine intake airflow.

While it is preferred to integrate the vacuum pump into the support bracket 32 as shown above, it is also possible to mount a self-contained vacuum pump to the support bracket 32 as a separate accessory, like the alternator. Alternatively, the accessories can be mounted directly to the engine 12 in a more common manner instead of being mounted on the transmission. If mounted on the engine, a support bracket may be used for one or more accessories with the vacuum pump of the invention integrated therein as shown or the pump may be a separate accessory carried by the bracket.

Figure 5:
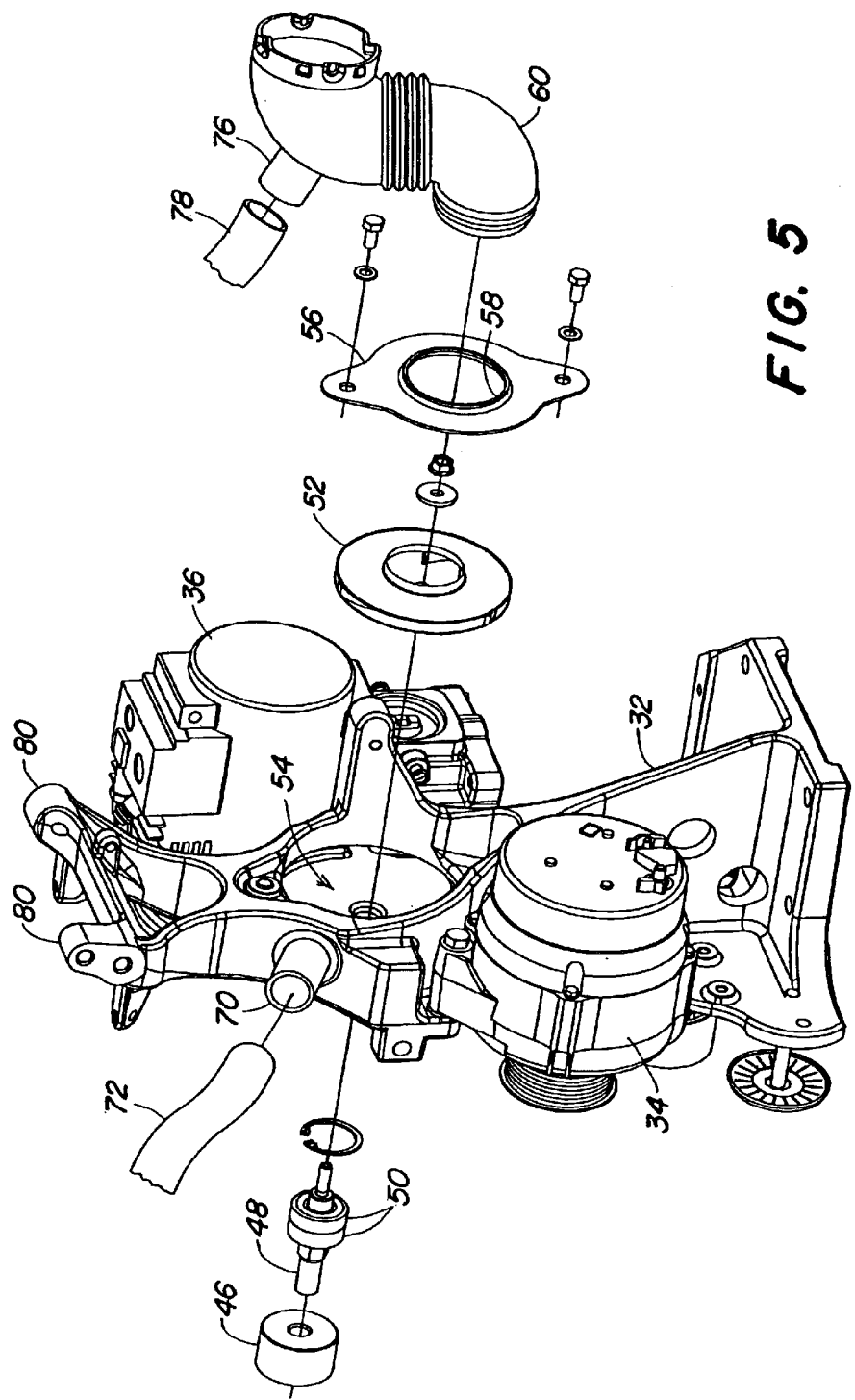
FIG. 5 is a perspective view of the support bracket similar to FIG. 3 illustrating an alternative embodiment of the invention.

An alternative embodiment is shown in FIG. 5. The air outlets 62, 64 are replaced with an outlet fitting 70 on the support bracket. An air hose 72 is coupled to the fitting 70 and extends to a remote location on the work vehicle 10. The hose 72 can be used as a blower on or around the work vehicle.

In yet another alternative embodiment, also shown in FIG. 5, the inlet pipe 60 is provided with a fitting 76 and another hose 78 is connected thereto. The hose 68, since it is on the vacuum side of the vacuum pump, can be used as a vacuum cleaner in or about the vehicle 10. The hose 78 can be equipped with appropriate valving to close off the hose 78 when not needed as a vacuum cleaner to apply the full vacuum to the pre-cleaner 30. The vacuum pump is capable of providing additional functionality to the vehicle beyond supplying the vacuum to the pre-cleaner. Neither of these functions are possible or practical with the exhaust aspirator or fan shroud aspirator.

With reference again to FIGS. 1 and 3, the upper end of the support bracket 32 has mounting bosses 80. A link 82 (FIG. 1) couples the hood 22 to the mounting bosses 80 at the top of the support bracket. The support bracket 32 provides support for the hood 22 as well.

Having described the preferred embodiment, it will become apparent that various modifications can be made without departing from the scope of the invention as defined in the accompanying claims. Furthermore, while it may be preferred to use one belt for multiple accessories as shown, a belt dedicated to driving the vacuum pump alone, could be used.

What is claimed is:

1. A work vehicle comprising:

an internal combustion engine;

a transmission;

a ground engaging drive member;

a vacuum pump having an air inlet, an air outlet and a rotary blade driven by engine power; and an air inlet pipe having a first end coupled to the air inlet of the vacuum pump and a second end coupled to a pre-cleaner, the air inlet pipe further having an additional fitting wherein a first elongated fluid conduit is coupled to the additional filling providing fluid communication to a location remote from the vacuum pump, the first elongated fluid conduit having a valve by which the conduit can be selectively opened or closed whereby when opened the conduit can be used as a vacuum cleaner in or about the vehicle and when closed a full vacuum created by the vacuum pump is applied to the pre-cleaner.

2. The work vehicle as defined by claim 1 wherein the vacuum pump air outlet is in fluid communication with a second elongated conduit extending to a location remote from the vacuum pump wherein the second elongated conduit and vacuum pump are together functional as a blower on or around the vehicle.

* * * * *